W. F. TELLER.
HOT PLATE.
APPLICATION FILED JUNE 18, 1917.

1,267,932.

Patented May 28, 1918.
2 SHEETS—SHEET 1.

W. F. Teller, Inventor,

Witness

By Attorneys.

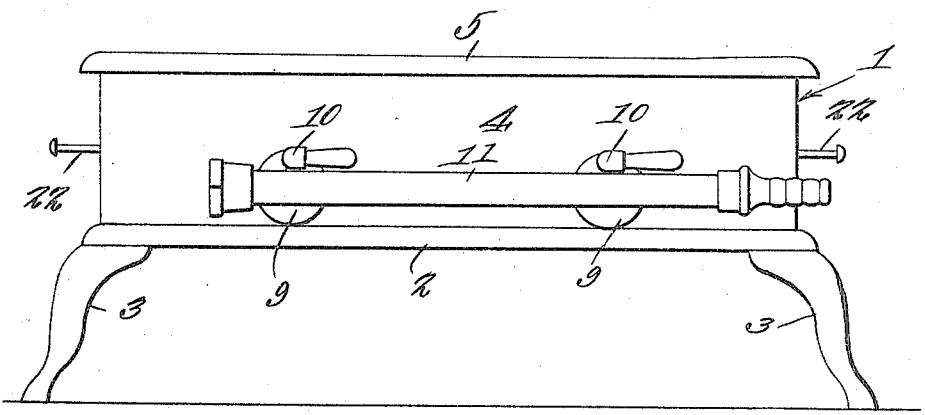
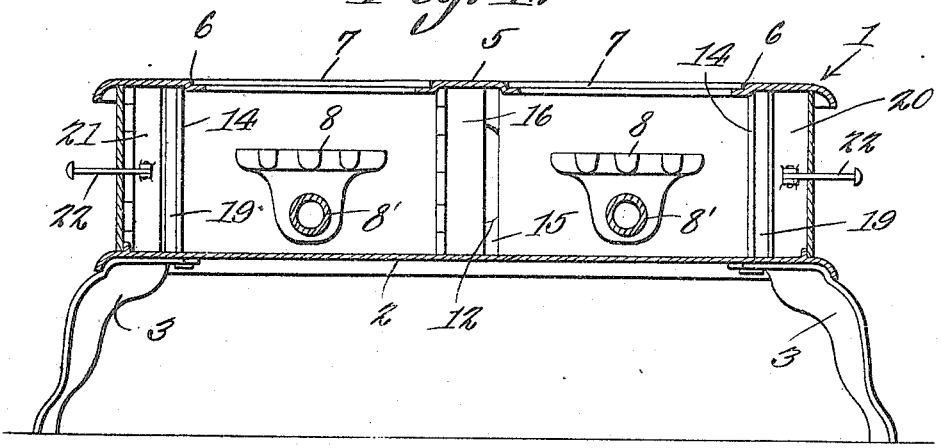

UNITED STATES PATENT OFFICE.

WILLIAM F. TELLER, OF COLUMBUS, OHIO.

HOT-PLATE.

1,267,932.   Specification of Letters Patent.   Patented May 28, 1918.

Application filed June 18, 1917. Serial No. 175,470.

*To all whom it may concern:*

Be it known that I, WILLIAM F. TELLER, a citizen of the United States, residing at Columbus, in the county of Franklin and State of Ohio, have invented a new and useful Hot-Plate, of which the following is a specification.

The present invention appertains to gas stoves, commonly known as hot plates, and it is the object of the invention to provide a hot plate wherein the burners are inclosed, to avoid the escape of the fumes, and provided with novel means for controlling the flow of the products of combustion, whereby to economize the consumption of fuel and render the device more efficient.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein:

Fig. 3 is a front view.

Fig. 4 is a longitudinal section on the line 4—4 of Fig. 1.

Figure 1:
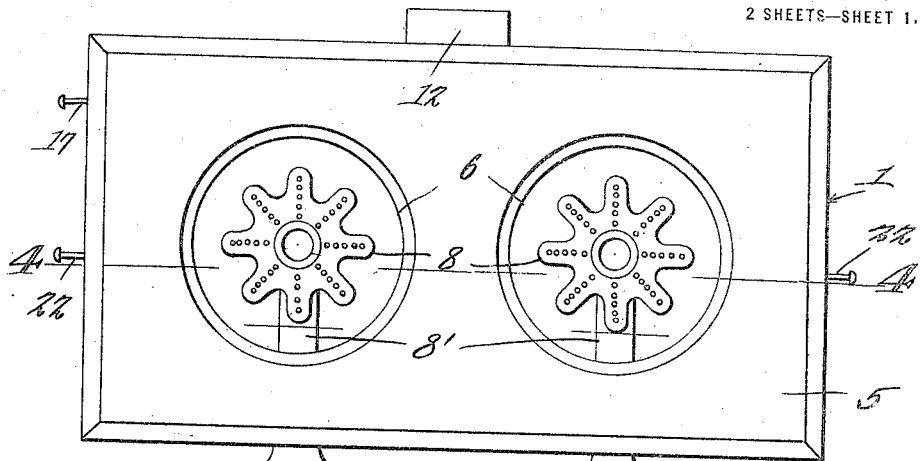
Figure 1 is a plan view of the improved hot plate, with the lids removed.
Figure 2:
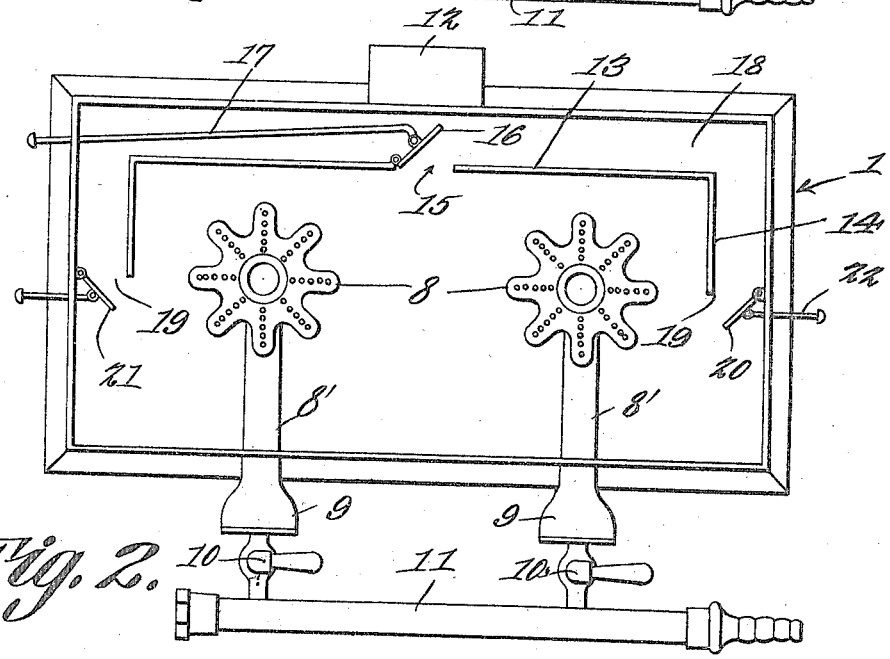
Fig. 2 is a plan view with the entire top of the casing removed to show the interior parts.

The hot plate embodies a casing 1 including the bottom 2, preferably supported by legs 3, walls 4 supported by the bottom 2, and a top 5 supported on said walls. The top 5 is provided between its center and ends with burner openings 6, which can be closed by lids 7 similar to those used in ordinary cook stoves. Burners 8 are seated on the bottom of the casing within the same underneath the openings 6, and have pipes 8' connected thereto and extending through the front wall of the casing and equipped with air mixers 9 and controlling valves 10, said valves being in turn connected to the supply pipe 11. The rear wall of the casing is provided intermediate the ends thereof with a stove pipe connection 12 providing an outlet for the products of combustion, whereby they can be led to a chimney, to avoid the discharge of the fumes into the room.

In order to control the flow of the products of combustion from the burners to the outlet 12, a longitudinal partition 13 is disposed in the casing completely between the bottom and top, adjacent and parallel with the rear wall. The partition 13 terminates slightly short of the end of the casing, and has forwardly projecting wings 14 adjacent to and parallel with the ends of the casing and terminating midway between the front and rear walls of the casing at the opposite side of the two burners. The partition 13 is provided intermediate its ends with an opening 15 registering with the outlet 12, for the direct outlet of the products of combustion, a damper 16 being hinged to the partition 13 for closing the opening 15 when desired. An operating rod 17 has its inner end pivoted to the damper 16 and extends out through one end of the casing for conveniently opening and closing the damper 16. A longitudinal flue or passage 18 is provided between the partition 13 and rear wall of the casing, extending in opposite directions from the outlet to the ends of the casing, and having its end portions extending forwardly along the ends of the casing to openings 19 forming the ends of said flue and opening into the main compartment of the casing at the opposite ends thereof. Dampers 20 and 21 are hinged to the ends of the casing for controlling the openings 19, and operating rods 22 are pivoted to the dampers 20—21 and pass slidably through the ends of the casing for conveniently opening and closing said dampers. The interior of the casing and partition are preferably lined with asbestos or other refractory material.

By provision of the partition and dampers, the hot plate can be used to advantage under various conditions. Thus, with one or both burners lighted, with all of the dampers open, the products of combustion can flow in the shortest paths or in the paths of least resistance to the outlet. By closing the damper 16, the products of combustion are constrained to flow from the dampers by way of the flue 18 to the outlet, thus retaining the heat within the casing. With the lefthand burner lighted, and the righthand burner extinguished, to economize fuel, the dampers 16 and 21 can be closed, and the damper 20 opened. Thus, a kettle or other object to be heated above the lefthand burner will not only be heated, but a second kettle can be placed over the righthand burner to be heated by the products of combustion which pass from the lefthand burner to the righthand end of the casing into the corresponding end of the flue 18. Conversely, by closing the damper 20 and opening the damper 21, the righthand burner can be used for heating a kettle thereover and a second kettle over the lefthand burner, since the products of combustion will now pass to the left from the righthand burner over the lefthand burner and under the lefthand opening 6 to the lefthand end of the flue 18. The arrangement of the partition and dampers, therefore, enables the operator to effectively control the outlet of the products of combustion to advantage.

Having thus described the invention, what is claimed as new is:

1. A hot plate embodying a casing having an outlet in its rear wall intermediate its ends, burners within the casing and situated between the center and ends thereof, a partition within the casing parallel with and spaced from the rear wall thereof, forwardly extending wings at the ends of said partition, said wings spaced from and parallel with the end walls and terminating at the line of centers between the front and rear walls, the partition and wings forming with the casing a flue having openings on opposite sides of the burners and adjacent the ends of the casing and an opening between the burners and adjacent the outlet, and individual dampers for the openings.

2. A hot plate embodying a casing having an outlet opening in its rear wall intermediate the ends of the casing, burners within the casing and adjacent each end thereof, and elements within the casing for directing gases of combustion from a burner to the opposite end of the casing, or about its end of the casing and to the outlet, or directly to the outlet.

In testimony that I claim the foregoing as my own, I have hereto affixed my signature in the presence of two witnesses.

WILLIAM F. TELLER.

Witnesses:
  S. STEFANSON,
  WM. D. CHERRY.

Copies of this patent may be obtained for five cents each, by addressing the "Commissioner of Patents, Washington, D. C."